United States Patent [19]
Lee

[11] Patent Number: 5,837,136
[45] Date of Patent: Nov. 17, 1998

[54] MINERAL ELUTING MATERIAL AND MANUFACTURING METHOD THEREOF, AND STRUCTURAL BODY OF MINERAL ELUTING MATERIAL

[75] Inventor: Duk-Soo Lee, Seongnam, Rep. of Korea

[73] Assignee: Samsung Electronics Co., Ltd., Suwon, Rep. of Korea

[21] Appl. No.: 734,001

[22] Filed: Oct. 18, 1996

[30] Foreign Application Priority Data

Dec. 18, 1995 [KR] Rep. of Korea ................. 1995-51454

[51] Int. Cl.⁶ .......................... B01D 39/06; B01D 39/20
[52] U.S. Cl. .................... 210/207; 210/264; 210/290; 210/504; 210/506; 210/510.1; 106/488; 106/501.1; 156/89; 156/336; 427/228; 427/374.1; 427/430.1; 428/532; 501/148; 501/150
[58] Field of Search ............... 106/12, 482, 486, 106/488, 501.1, 639; 210/264, 290, 504, 506, 510.1, 916, 917, 205, 207; 156/89, 336; 427/228, 374.1, 430.1; 428/532; 501/145, 146, 148, 150

[56] References Cited

U.S. PATENT DOCUMENTS

| 143,096 | 3/1873 | Rust | 501/150 |
|---|---|---|---|
| 1,131,463 | 3/1915 | Berry | 501/150 |
| 4,747,686 | 5/1988 | Sato | |
| 4,782,231 | 11/1988 | Svoboda et al. | |
| 5,190,900 | 3/1993 | Toro et al. | 501/148 |

FOREIGN PATENT DOCUMENTS

| 0 421 563 | 4/1991 | European Pat. Off. |
| WO86/07048 | 4/1986 | WIPO . |
| WO96/15990 | 5/1996 | WIPO . |

OTHER PUBLICATIONS

Derwnt Abstract 84–285008 for JP 59–175404, Oct. 1984.

Primary Examiner—W. L. Walker
Attorney, Agent, or Firm—Burns, Doane, Swecker & Mathis, L.L.P.

[57] ABSTRACT

The present invention relates to a mineral eluting material for drinking water with granite as raw material and manufacturing method thereof and a structural body of mineral eluting material. The mineral eluting material includes granite crushed to sizes of 0.075~0.145 mm, submerged in 3~10% glucose solution for 24 hours, baked at 380°~400° C. for 12~24 hours, and cooled at room temperature in a tightly sealed vessel. The structural body according to the present invention is manufactured by piling up granular granite and silver activated charcoal in 2–10 layers respectively and alternately in a cylindrical column. Water having passed the structural body according to the present invention comprising granular granite contains no impurities and abounds in minerals.

23 Claims, 1 Drawing Sheet

MINERAL ELUTING MATERIAL AND MANUFACTURING METHOD THEREOF, AND STRUCTURAL BODY OF MINERAL ELUTING MATERIAL

BACKGROUND OF THE INVENTION

1. Field of the Invention

The present invention relates to a mineral eluting material used for drinking water, and more particularly to a mineral eluting material containing granite granules as essential ingredients and manufacturing method thereof, and a structural body of the mineral eluting material.

2. Description of the Prior Art

What is important to a human being living on drinking water is to absorb adequate amount of various minerals necessary for a living body through water in the aspect of biochemical mechanism.

Recently, a near distilled water having passed a semipermeable membrane by reverse osmosis is usually taken as drinking water because water has been polluted due to environmental contamination. However, it is well known that distilled water is not suitable as drinking water. In other words, pure water is a colorless and odorless liquid, and according to storage method thereof, there are cases where water contains exothermic materials harmful to a human body, and in other cases, when the pure water is exposed to and left in the air, it absorbs carbon dioxide and then becomes weak acidic (Japanese Chemical Dictionary Vol. 4. P.823. 1979). Furthermore, the use of distilled water, which is sterilized under high-pressure steam, is confined to only a pharmacopoeial aseptic test. Such sterilized distilled water is used for eye drops, injection or the like and is also used to prepare various medicines and standard solutions.

Meanwhile, a small amount of inorganic material and mineral such as calcium, magnesium, carbonate or the like is dissolved in natural drinking water which we usually enjoy, so that we can feel refreshed when drinking (Colorful Science Dictionary Volume 4. P.401. 1971).

According to a NMR analysis, it is reported that a total of 15 kinds of life-sustaining minerals such as Ca, Mg, Na and K, and Fe, Ti, Zn, Mn or the like as trace elements may be completely dissoved in natural drinking water, so that various nutrients can be smoothly absorbed through a plasma membrane into a cell. These minerals are known to form fine clusters with water molecules, thereby making a stable hexagonal structures (Environmental Engineering Laboratories p.14, 21), and when vitamin C is dissolved in the fine cluster structures and absorbed into a cell, its absorption ratio becomes high, which can be proven by means of osmotic pressure measurements.

Accordingly, it is necessary to take water containing an adequate quantity of minerals in order to maintain equilibrium between protein and ionic substances in a biological body. Positive ions are major part of dissolved substances in the water, and calcium thereamong is absorbed into a human body to aid digestion, to form bones and teeth, to help blood coagulate when bleeding, and to maintain actions of muscles and nervous system (An Introduction to Underground Water Science p. 14~31, 1983). Magnesium also plays a role of maintaining brain and nervous system. If calcium and magnesium are deficient in the human body, symptoms such as incomplete development and the like are developed (Nutrition of Extreme Trace Elements, Vol. 233, p. 140~185, 1984).

It is desired to take potassium and sodium in balanced proportions and intake thereof is 2 to 4 grams/day for an adult. Potassium serves to contol osmotic pressure in a cell, regulate actions of muscles and nervous system, and maintain a uniform blood pressure by keeping in equilibrium with sodium. Sodium serves to adjust osmotic pressure between cells, pH of body fluid, stimulation of muscles and nervous system, and to maintain water balance in a human body (A Guide to Water Control for Drinking Water (the Korean Ministry of Health and Social Affairs), p. 270~510, 1991). An ideal ratio between potassium and sodium is 2:1 in the body fluid.

Once iron is absorbed into the human body, it is used to make hemoglobin and myoglobin in blood and transports oxygen in the blood. Zinc is known to be involved in growth, appetite, anemia, growth of genital organs and the like. Besides, chlorine ions bind to cations so as to assist in the osmotic action of cell fluid and to help digestion. Sulfuric acid ions are known to have good medical effects on alleviation of constipation, elastic skin and treatment of dermatopathy.

From old times, it has been well-known that mineral waters eluted from the layers of granite have a good and fresh taste. That is to say, the taste of water is the most delicious when mineral water is eluted through the layers of the granite, especially because it contains adequate amount of eluted minerals such as Ca, Mg, K and the like.

Thus, the present inventor has repeatedly studied in order to obtain water containing adequate amount of minerals necessary for maintaining equilibrium between proteins and ionic substances in a human body, and found out that minerals are plentiful in water eluted through mineral eluting material containing granite particles as essential ingredients.

SUMMARY OF THE INVENTION

Accordingly, it is an object of the present invention to provide a mineral eluting material containing granite granules as essential ingredients and manufacturing method thereof.

It is another object of the present invention to provide a structural body of the mineral eluting material for manufacturing drinking water in which minerals are dissolved.

According to an aspect of the present invention, there is provided a method for manufacturing mineral eluting material comprising the steps of crushing granite to sizes of 0.075~0.145 mm; submerging the crushed granite powders in 3~10% glucose solution for sufficient period of time so that the glucose solution can be fully adsorbed therein; baking the powders in an electric furnace at 380°~400° C. for 12~24 hours; and cooling the baked powders in a closed vessel such as a desiccator at a room temperature to granulate the same.

According to another aspect of the present invention, there is provided a structural body of the mineral eluting material comprising a column alternately piled up by a plurality of granulated granite layers and a plurality of silver activated charcoal layers wherein the column is of a cylindrical shape with a diameter of 5 cm and a height of 27 cm, and is mounted at a lower portion thereof with an inlet for pouring water therethrough and at an upper portion thereof with an outlet for discharging water therethrough.

BRIEF DESCRIPTION OF THE DRAWINGS

For further understanding of the nature and objects of the invention, reference should be made to the following detailed description taken in conjunction with the accompanying drawings in which.

DETAILED DESCRIPTION OF THE INVENTION

Figure 1:
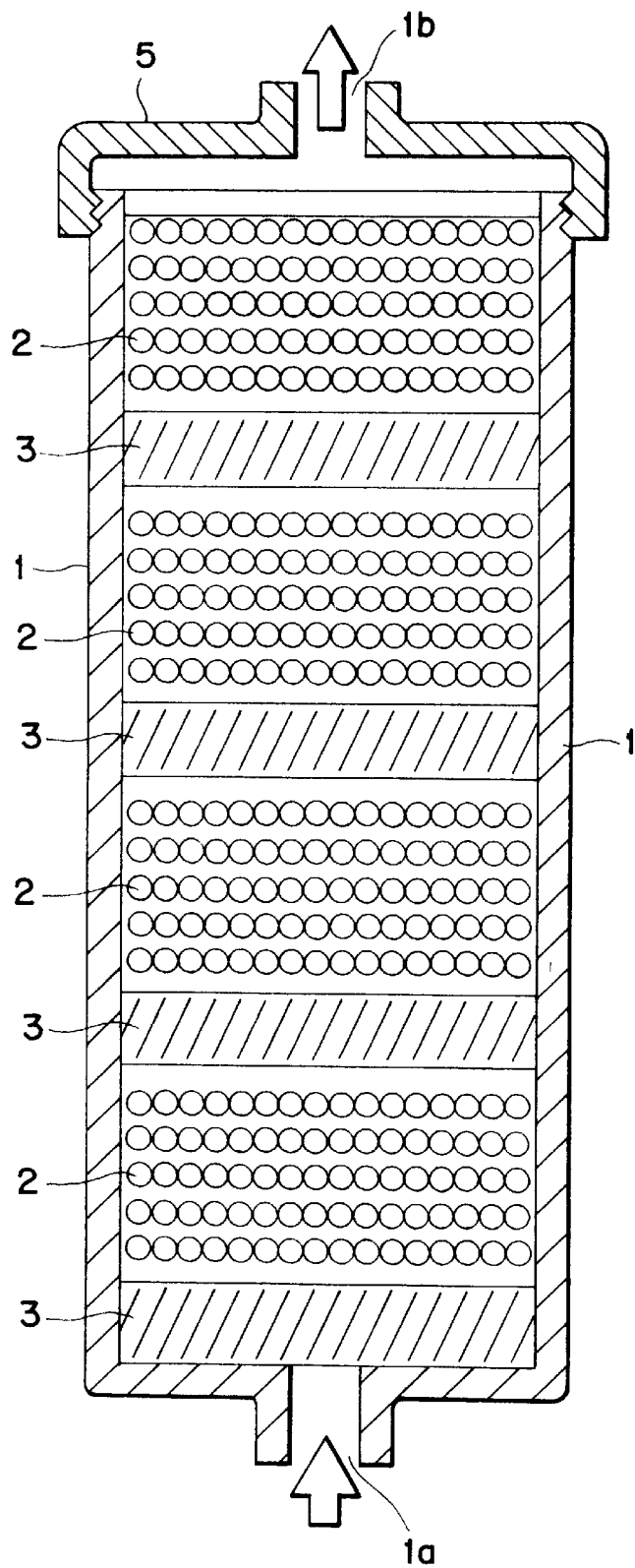
FIG. 1 is a sectional view for illustrating the filling state of granular granite and silver activated charcoal according to an embodiment of the present invention.

The granite used for the present invention mainly (over 80%) comprises $SiO_2$, $Al_2O_3$, and life-sustaining essential minerals such as Ca, Mg, Na, K, and trace elements of Fe, Ti, Zn, Mn and the like exist in the form of carbonate compounds and oxides.

When the granite powder is submerged in glucose solution and baked in an electric furnace, the glucose becomes carbonized to emit $CO_2$. $CO_2$ reacts with some constituents of granite such as CaO, MgO, $Na_2O$, $K_2O$ and the like thereby producing $CaCO_3$, $MgCO_3$, $Na_2CO_3$, $K_2CO_3$ and the like which exist in granules of the granite. Furthermore, extra $CO_2$ is dissolved in the water thereby making the water delicious. It is preferable to use the silver activated charcoal of quadrangular granule type in the first grade.

The granular granite and the silver activated charcoal can produce more effective results when used in as low density as possible and with as wide surface area as possible. As for a ratio of specific surface area ($cm^{-1}$) and density ($g/cm^3$), it is preferable that the granite has a ratio of 48–56 while the silver activated charcoal has a ratio of 15–17.

In order to satisfy the above-mentioned conditions, it is important that the granite be crushed to sizes of 0.075–0.145 mm, the crushed granite powders be submerged in 3~10% glucose solution for sufficient period of time so that the glucose solution can be fully adsorbed therein, and the powders be baked in an electric furnace at 380°~400° C. for 12~24 hours.

However, when the granite powders are below 0.075 mm in sizes thereof, specific surface area thereof becomes too wide. Accordingly, minerals are eluted very fast, so that the pH of the eluted solutin is more than 9. Besides, when the granite powders are above 0.145 mm in sizes thereof, elution quantity of the minerals is too little.

The silver activated charcoal serves to play sterilizing and antibiotic roles. The ratio of density and specific surface area should be adjusted in order that elution quantity of silver remains under standard rate of drinking water (10 ppm).

In the structural body according to the present invention, the most preferable density and specific surface area for granular granite are 1.564 $g/cm^3$ and 82.759 $cm^{-1}$ respectively, and for the silver activated charcoal are 0.637 $g/cm^3$ and 10.345 $cm^{-1}$ respectively.

Now, the present invention will be described in detail according to preferred embodiments.

EXAMPLE 1

Granite was crushed to a size of 0.145 mm in average diameter and submerged in glucose solution of 8% for 24 hours and baked in an electric furnace at 400° C. for 12 hours. Then the granite particles were cooled at room temperature thereby producing granular mineral eluting materials.

The granular granite of 583 grams and silver activated charcoal (G-S 1st grade from Kuraray Chemical Company in Japan) of 100 grams were stuffed into a column 1 as illustrated in FIG. 1.

In other words, in order to make a structural body of the mineral eluting material according to the embodiment of the present invention, a lid 5 of column 1 was opened, silver activated charcoal layer 3 was inserted thereinto and granular granite layer 2 was inserted thereinto. The silver activated charcoal layer 3 and the granular granite layer 2 was formed in the column 1 in 4 layers respectively.

Stuffed density and specific surface area of the granular granite layer 2 and the silver activated charcoal layer 3 stuffed in the column 1 were 1.564 $g/cm^3$ and 82.759 $cm^{-1}$ respectively, and 0.637 $g/cm^3$ and 10.345 $cm^{-1}$ respectively.

The lid 5 was closed and water was infused through an infusion inlet 1a to thereby allow the water to pass through the silver activated charcoal layer 3 and the granular granite layer 2. The water discharged through a discharge outlet 1b of the column 1 was used as drinking water.

EXAMPLE 2

Drinking water was produced in the same manner as in the first embodiment except for an average diameter of the granite being set at 0.1 mm.

EXAMPLE 3

Drinking water was produced in the same manner as in the first embodiment except for an average diameter of the granite being set at 0.075 mm.

The drinking water was put to the following tests and the test results therefrom are listed in Table 1.

Physical properties between water passed through reverse osmosis system and water passed through structural body of the mineral eluting material.

① Hydrogen ion concentration (pH)

Measured pH values of the water passed through the reverse osmosis system, and the water discharged from the discharge outlet 1b through the infusion inlet 1a of the column 1 according to the present invention, the silver activated charcoal layers 3 and the granular granite layers 2, are given in Table 1.

The water that has passed the reverse osmosis system maintains a state of acidic pure water. The reason pH went down to 5.71 is that the water was affected by $CO_2$ in the air, or the water consists of water molecules in pure $H_3O^+$ form by removing all materials dissolved in the water through semipermeable membrane.

On the other hand, the water, which has passed through the structural body of mineral eluting material according to the embodiment of the present invention, is estimated to be weak basic by the following processes.

In other words, in case of calcium ion,

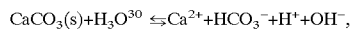

In case of patassium ion and magnesium ion,

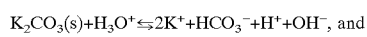

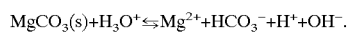

As per the above formulae, pH is understood to be increased by about 1.91 due to such ions as $Ca^{2+}$, $K^+$, $Mg^{2+}$ and the like.

② Surface tension

Measured surface tension values of the water which has passed the reverse osmosis system, and the water which has passed through the infusion inlet 1a of the column 1 according to the present invention and then has been discharged from the discharge outlet 1b through the silver activated charcoal layers 3 and the granular granite layers 2 are given in Table 1.

Difference of surface tension between the water that has passed the reverse osmosis system and the water which has passed the structural body of mineral eluting material according to the embodiment of the present invention is about 0.5. It is understood that the surface tension of the water weakens because huge cluster structure of the water is rearranged into a group of small and stable clusters encircling minerals by various minerals including calcium and the like.

The surface tension consists of hydrogen bond strength and Van der Waals force between the water molecules and clusters (F. M. Fowkes, "In chemistry and physics" P.28, volume 493, 1968), where two thirds of which are considered to be the hydrogen bond strength. Variation value of the surface tension of water at 20°~50° C. is about 2.15 dyne/cm, and variation amount of enthalpy is 62.8538 J/g water. It is therefore understood that mineral components and the water molecules have an energy of 17.5405 J/g water (=62.8538×0.6/2.15), which is made possible by mineral ions in the water that has passed the granite layer. The surface tension is estimated to be weakened due to rearrangement of the clusters by means of the energy.

③ Electric Conductivity

Measured results of electric conductivity of the water which has passed the reverse osmosis system, and the water which has passed through the infusion inlet $1a$ of the column 1 according to the present invention and then has been discharged from the discharge outlet $1b$ through the silver activated charcoal layers 3 and the granular granite layers 2 are given in Table 1.

As shown in Table 1, the water that has passed through the structural body of mineral eluting material according to the embodiment of the present invention has higher electric conductivity than the water which has passed through the reverse osmosis system by about 2.44 times.

The reason is that migration degree of $OH^-$ ion is understood to be increased when mineral ions destroy water clusters of high electric resistance and the water clusters are rearranged.

According to known facts, the electric conductivity is increased because migration speed of $OH^-$ is increased with regard to most of water where positive ions are dissolved (H. L. Clever J. Chem. ed.1, P.40, volume 637, 1963).

④ Degree of polarization

Measured results of polarization degree for the water which passed the reverse osmosis system, and the water which has passed through the infusion inlet $1a$ of the column 1 according to the present invention and then has been discharged from the discharge outlet $1b$ through the silver activated charcoal layers 3 and the granular granite layers 2 are given in Table 1.

Isotropic material has a refraction coefficient irrespective of direction, but in case of anisotropic material having different numbers and arrangements of atoms in a molecule, two polarized lights progressing in mutually different directions are formed according to the direction of the refraction coefficient.

In other words, the water that has passed the reverse osmosis system is nearly in a pure state, and degree of polarization is about 0.1 because clusters are anisotropic. The water which has passed the structural body of mineral eluting material is estimated to have isotropic cluster structures due to mineral distribution, so that degree of polarization thereof is believed to be vary small.

⑤ Osmotic Pressure (cell permeability)

Measured results of osmotic pressure of the water which has passed the reverse osmosis system, and the water which has passed through the infusion inlet $1a$ of the column 1 according to the present invention and then has been discharged from the discharge outlet $1b$ through the silver activated charcoal layers 3 and the granular granite layers 2 are given in Table 1. The osmotic pressure was measured against 10% soluble starch solution in a capillary tube equipped with a semipermeable membrane (egg cell membrane).

As shown in Table 1, the osmotic pressure of the water that has passed the structural body of mineral eluting material according to the embodiment of the present invention is larger by about 1.4 times than that of the water which has passed the reverse osmosis system. This is because structural bodies of water formed by mineral ions are evenly arranged around a cell surface, so that it is estimated that the water having passed the structural body of the mineral eluting material moves more smoothly through the cell membrane than the pure water having passed the reverse osmosis system.

In other words, like the large electric conductivity due to mineral ions, it is estimated that water moves fast, small and stable clusters are mainly configured around the cell membrane and equilibrium due to ion exchange is realized at a shorter time span.

TABLE 1

| item Sample | pH | surface tension (dyne/cm) | electric conductivity ($\mu s$) | degree of polarization | osomotic pressure (atmospheric pressure) |
|---|---|---|---|---|---|
| Example 1 | 7.60 | 80.6 | 18.1 | 0.05 | 3.2 |
| Example 2 | 7.60 | 80.4 | 18.2 | 0.05 | 3.2 |
| Example 3 | 7.62 | 80.9 | 18.5 | 0.05 | 3.2 |
| comparative example* | 5.71 | 81.2 | 7.5 | 0.10 | 2.8 |

*water having passed the reverse osmosis system

Analytic results of the water (Example 1) having passed through the structural body of mineral eluting material according to the present invention are listed in Table 2 according to the drinking water quality standard.

TABLE 2

Unit: ppm

| test item | water quality standard | test result |
|---|---|---|
| chromaticity | 5 | 1.2 |
| turbidity | 2 | 1 |
| odor | No odor | — |
| taste | No taste | — |
| evaporation residue (mg/l) | 500 | 54 |
| hydrogen ion concentration (pH) | 5.8~8.5 | 7.3 |
| hardness (mg $CaCO_3$) | 300 | 24 |
| $NH_4$—N | 0.5 | 0.076 |
| $NO_3$—N | 10 | ND |
| chlorine ion ($Cl^-$) | 150 | 2.423 |
| residual chlorine | 0.2 | ND |
| cyanide ion ($CN^-$) | ND | ND |
| fluorine ion ($F^-$) | 1 | ND |
| sulfuric acid ion ($SO_4^{2-}$) | 200 | ND |
| arsenic (As) | 0.05 | ND |
| cadmium (Cd) | 0.01 | ND |
| copper (Cu) | 1 | ND |
| chromium (VI) ion ($Cr^{6+}$) | 0.05 | ND |
| iron (Fe) | 0.3 | 0.03 |
| mercury (Hg) | ND | ND |
| manganese (Mn) | 0.3 | ND |

TABLE 2-continued

Unit: ppm

| test item | water quality standard | test result |
|---|---|---|
| lead (Pb) | 0.05 | ND |
| Zinc (Zn) | 1 | ND |
| KMnO$_4$ consumption amount | 10 | 0.8 |
| detergent (ABS) | 0.5 | ND |
| malathion | 0.25 | ND |
| parathion | 0.06 | ND |
| fenitrothion | 0.04 | ND |
| diazinon | 0.02 | ND |
| phenol | 0.005 | ND |
| trihalomethane | 0.1 | ND |
| bacteria | 100/ml | ND |
| E, coli | ND/50 ml | ND |
| calcium (Ca) | — | 16.312 |
| magnesium (Mg) | — | 0.625 |
| potassium (K) | — | 1.148 |
| sodium (Na) | — | 2.625 |
| aluminum (Al) | 0.2 | ND |

ND: Not detected

As shown in Table 2, the water having passed through the structural body of mineral eluting material is characterized by:

1. no detection of general bacteria, *E. coli*, detergents and organic materials;
2. very little amount detection or no detection at all of ammoniacal nitrogen or nitric acid type nitrogen;
3. no detection of most heavy metals; and
4. mineral ions dissolved in an appropriate level.

As described above, there is an advantage in the water having passed through the structural body of mineral eluting material using granite according to the present invention, in that there is almost no change of pH and an appropriate amount of minerals is dissolved therein, thereby providing optimum drinking water.

What is claimed is:

1. A method of manufacturing a mineral eluting material, comprising the steps of:
    submerging granite particles in a glucose solution for a time effective to adsorb the glucose solution therein;
    baking said granite particles; and
    cooling said granite particles.
2. The method according to claim 1, wherein said granite particles are obtained by crushing a granite material.
3. The method according to claim 1, wherein said granite particles have an average size in the range of from 0.140 to 0.145 mm.
4. The method according to claim 1, wherein said granite particles comprise Ca, Mg, K, Na, or a mixture thereof, SiO$_2$, and Al$_2$O$_3$.
5. The method according to claim 4, wherein said granite particles further comprise Fe, Ti, Mn, Zn, or a mixture thereof.
6. The method according to claim 4, wherein said Ca, Mg, K, Na, or said mixture thereof, said SiO$_2$, and said Al$_2$O$_3$ account for greater than 80% of the total composition of said granite particles.
7. The method according to claim 1, wherein said glucose solution has a concentration in the range of from 3 to 10%.
8. The method according to claim 1, wherein said granite particles are baked at a temperature in the range of from 380° to 400° C., for a time in the range of from 12 to 24 hours.
9. The method according to claim 1, wherein said granite particles are cooled at room temperature during said cooling step.
10. The method according to claim 1, wherein said granite particles are cooled in a closed vessel during said cooling step.
11. The method according to claim 10, wherein said closed vessel is a desiccator.
12. A mineral eluting material, prepared by the method according to claim 1.
13. The mineral eluting material according to claim 12, wherein said granite particles have an average size in the range of from 0.140 to 0.145 mm.
14. The method according to claim 12, wherein said granite particles comprise Ca, Mg, K, Na, or a mixture thereof, SiO$_2$, and Al$_2$O$_3$.
15. The method according to claim 14, wherein said granite particles further comprise Fe, Ti, Mn, Zn, or a mixture thereof.
16. The method according to claim 14, wherein said Ca, Mg, K, Na, or said mixture thereof, said SiO$_2$, and said Al$_2$O$_3$ account for greater than 80% of the total composition of said granite particles.
17. A structural body of mineral eluting material comprising:
    a column containing the mineral eluting material according to claim 12 and a silver activated charcoal;
    a water inlet; and
    a water outlet.
18. The structural body according to claim 17, wherein said silver activated charcoal is of a quadrangular type.
19. The structural body according to claim 17, wherein said granular mineral eluting material and said silver activated charcoal are present in alternating layers in said column.
20. The body according to claim 19, wherein a plurality of layers of said granular mineral eluting material and a plurality of layers of said silver activated charcoal are present in said column.
21. The body according to claim 17, wherein a ratio of specific surface area to density of said granular mineral eluting material is in the range of from 48 to 56 cm$^2$/g.
22. The body according to claim 17, wherein a ratio of specific surface area to density of said silver activated charcoal is in the range of from 15 to 17 cm$^2$/g.
23. The body according to claim 17, wherein the column is cylindrical in shape, and said water inlet and said water outlet are disposed at opposite ends of said column.

* * * * *